Patented Nov. 21, 1950

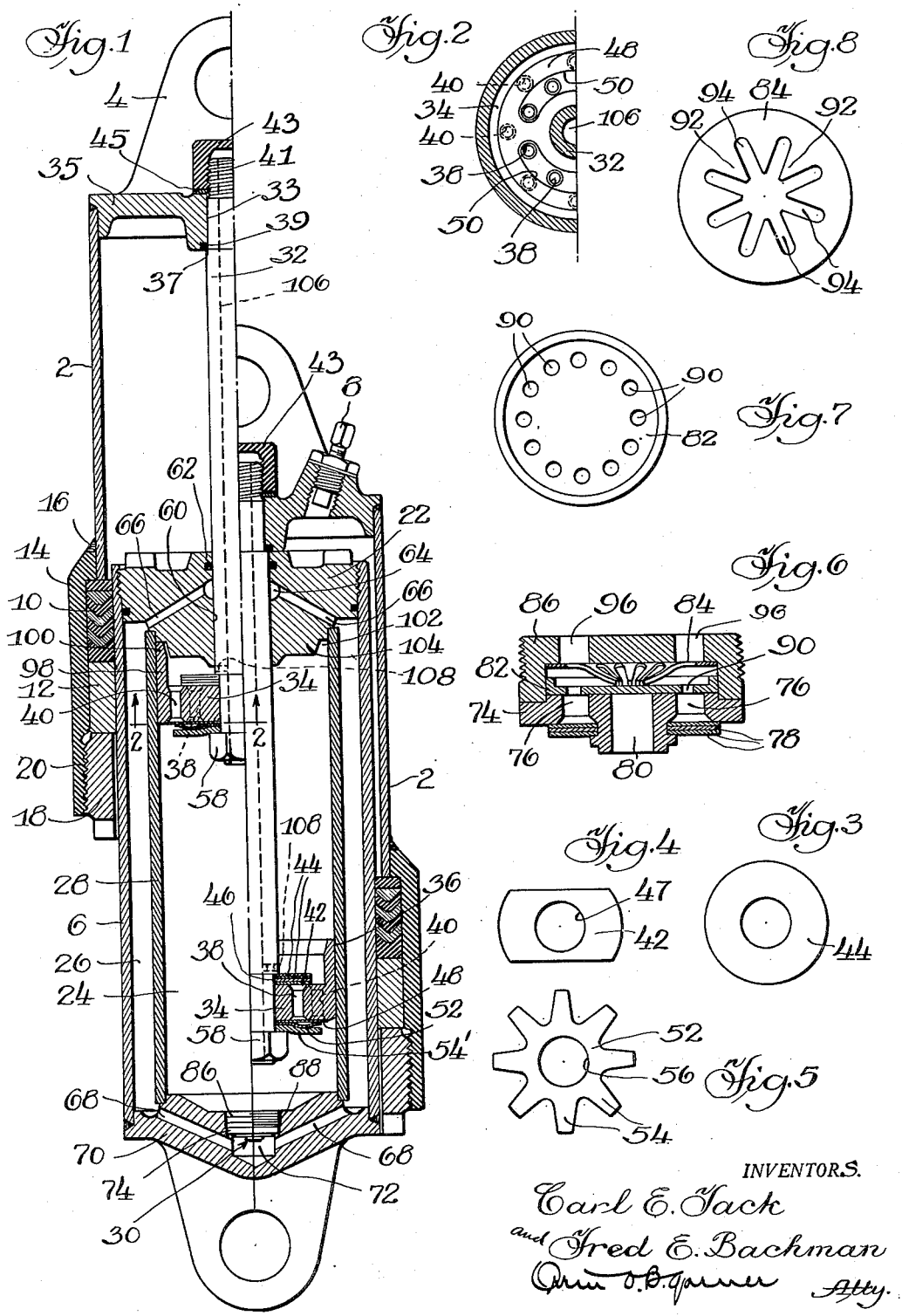

2,531,368

UNITED STATES PATENT OFFICE 2,531,368

SHOCK ABSORBER

Carl E. Tack and Fred E. Bachman, Chicago, Ill., assignors to American Steel Foundries, Chicago, Ill., a corporation of New Jersey Application June 30, 1944, Serial No. 543,020

2 Claims. (Cl. 267—64)

Our invention relates to shock absorbers and more particularly to an hydraulic device commonly called an oleo strut, such device being adapted for utilization particularly in the connection between the landing gear and fuselage of aircraft.

The primary object of our invention is to design a strut such as above described, wherein a compressed gas spring is provided for the purpose of urging the strut to its normal extended position after compression or closure thereof, said gas spring being spaced from the hydraulic fluid within the device to prevent foaming of said fluid.

Another object of our invention is to provide a novel hollow piston rod carried by the strut cylinder and reciprocal within the hollow piston, said rod carrying a piston head at its inner end comprising means for metering the hydraulic fluid within the hollow piston.

In our novel arrangement the piston rod is provided with an axial passage to permit filling of the internal piston chamber with hydraulic fluid without disassembling the strut, said passageway being closed by means of a cap threaded on the outer extremity of the piston rod.

In the drawings, Figure 1 is a sectional view taken in a plane bisecting our novel structure substantially on the longitudinal axis thereof, the left half of this figure showing the strut in its extended position and the right half of this figure showing the strut in its closed or compressed position.

Figure 2 is a sectional view taken in the radial plane indicated by the line 2—2 of Figure 1.

Figures 3 to 5, inclusive, illustrate various elements of the metering valve assembly carried by the piston head, Figure 3 being a plan view of the spring washer, Figure 4 being a plan view of the resilient valve plate, and Figure 5 being a plan view of the valve spring.

Figure 6 is an enlarged sectional view showing in detail the reservoir valve illustrated in Figure 1; and Figures 7 and 8 are plan views, respectively, of the valve plate and the valve spring utilized in the reservoir valve.

Describing our invention in detail, my novel structure comprises a top follower in the form of a cylinder 2 with a bracket 4 affording convenient connection to the fuselage of an associated aircraft (not shown). A hollow piston 6 reciprocates within the cylinder 2 against the resilient resistance of a compressed gas spring consisting of a quantity of compressed gas, such as air, which is forced into the cylinder 2 through a fitting 8. The piston 6 is afforded a slidable gas-tight fit within the cylinder 2 by means of an annular packing gland 10 and an annular bearing 12 received within a collar 14 secured to the lower extremity of the cylinder 2, as by welding at 16. The bearing 12 is compressed against the gland 10 by means of a packing gland nut 18 in threaded engagement as at 20 with the sleeve 14.

The piston 6 is a hollow member comprising a piston head 22 and radially inner and outer hydraulic fluid chambers 24 and 26 separated by the annular wall 28, the outer annular chamber 26 functioning as a reservoir to collect leakage fluid and return the same to the main chamber 24, as hereinafter more particularly described, through the reservoir valve generally designated 30.

The cylinder 2 carries a hollow piston rod 32, which extends at its upper extremity through an opening 33 in the top wall or head 35 of the cylinder, said rod being in shouldered engagement at 37 with a gasket 39 affording a gas-tight seal for the opening 33. The upper extremity of the rod is threaded as at 41 for engagement with a threaded cap 43, which is seated against a gasket 45 and is operable to draw the rod 32 into tight engagement with the gasket 39.

Adjacent its lower extremity, the rod 32 carries the piston head 34 slidably engaging the wall 28 as at 36, said head 34 comprising valve means for metering hydraulic fluid within the chamber 24, as hereinafter more particularly described. The piston head valve means comprises a plurality of radially inner ports 38, 38 and a plurality of radially outer ports 40, 40. As will be understood from a consideration of Figure 2, the ports 38, 38 are eight in number, and the upper extremities of four of these ports are closed by the resilient valve plate 42, which comprises the central opening 47 for the reception of the rod 32. A plurality of annular spring washers 44, 44 are interposed between the resilient valve plate 42 and a shoulder 46 adjacent the lower extremity of the rod 32.

The lower extremities of the ports 40, 40 are closed by a resilient valve plate 48 comprising slots 50, 50 registering with the lower extremities of the ports 38, 38, and the valve plate 48 is resiliently urged to its closed position by means of a spring 52 and a washer 54'.

The spring 52, as best seen in Figure 5, is a somewhat star-shaped resilient disc comprising a plurality of prongs 54, 54 for engagement with the plate 48, and the disc 52 also comprises a central opening 56 for the reception of the piston rod 32. A nut 58 is threaded on the lower end of the rod 32 and is operable to urge the piston head 34 and the above-mentioned valve elements into a pile against the shoulder 46 of the rod 32.

The piston rod 32 reciprocates within an opening 60 through the piston head 22 and is afforded a gas-tight slidable fit therewith by means of the oil ring 62; and the piston head 22 is provided with an annular groove 64 communicating by means of ports 66, 66 with the reservoir chamber 26. Thus, any leakage oil from the chamber 24 collects in the groove 64 and is conveyed by means of the ports 66, 66 to the reservoir chamber 26 from which it passes into ports or passages 68, 68 in the bottom wall 70 of the piston.

The oil from the reservoir chamber 26 collects in a well or chamber 72 from which it is returned to the chamber 24 by means of the reservoir valve 30. The valve 30 is illustrated in detail in Figures 6 to 8 and includes an annular base plate 74 recessed in the wall 70 of the piston, said base plate comprising a plurality of ports 76, 76 closed by means of a plurality of spring washers 78, 78 and the base plate 74 comprises the central port or passage 80, closed by means of a valve plate 82, which is resiliently urged to its closed position by means of a spring 84 bearing against the valve cap 86, which is threaded at 88 into the wall 70 of the piston to maintain the various elements of the reservoir valve 30 in normal assembled relationship. The valve plate 82 is shown in detail in Figure 7, from which it will be seen that said plate is a round rigid member with a plurality of ports 90, 90 registered with the beforementioned ports 76, 76 through the base plate 74.

The spring 84 is an annular disc-like member comprising a plurality of prongs or projections 92, 92 extending toward the center of the member 84 and defining therebetween slots 94, 94 permitting hydraulic fluid to pass therethrough; and the cap 86 is provided with a plurality of ports 96, 96.

Thus, it will be understood that on the compression or closure stroke of our novel strut, as seen in the right half of Figure 1, hydraulic fluid is metered through the four ports 38, 38 which are not closed by the resilient valve plate 42. Under certain conditions wherein the structure is moved rapidly to its closed position, hydraulic pressure in the other four ports 38, 38 flexes the valve plate 42 to its open position, thus admitting the hydraulic fluid through all eight of the ports 38, 38 as the strut is compressed.

On the release or extension stroke of the strut, the hydraulic fluid within the chamber 24 is metered through the ports 40, 40 by urging the resilient valve plate 48 to its open position against the resistance of the spring 52; and it may be noted at this point that the upper extremity of the piston head 34 is formed with an upstanding annular flange or projection 98 with a tapered upper extremity 100, which is received within the tapered annular dashpot chamber 102 formed by the piston wall 28 and the depending boss 104 integrally formed with the piston head 22. Thus, as the tapered extremity 100 of the flange 98 enters the annular chamber 102, hydraulic fluid is metered from said chamber to effect additional dampening of the extension stroke of the piston at the extremity of said stroke.

It will be understood that on the closure stroke of the strut some of the hydraulic fluid within the chamber 24 is metered through the ports 76, 76 and 90, 90 of the reservoir valve 30 against the resilient resistance of the spring washer 78, 78, and on the extension stroke of the strut, the hydraulic fluid within the well 72 passes upwardly through the port 80, the ports 90, 90 and the ports 96, 96 into the chamber 24 against the resistance of the spring 84.

Inasmuch as the spring 84 is relatively weak with respect to the spring washer 78, 78, fluid within the well 72 may pass into the chamber 24 against less resistance than that encountered on the closure stroke of the device when some fluid within the chamber 24 is forced into the chamber 72 through the valve 30, as above described. Because of this arrangement, surplus fluid within the reservoir chamber 26 is constantly circulated through the valve 30 into the chamber 24, thus restoring to said chamber 24 any leakage fluid which escapes therefrom through the annular groove 64 in the piston head 22.

As mentioned above, the rod 32 is a hollow member comprising a central axial passage 106 extending from end to end thereof, said passage communicating with the portion of the chamber 24 above the piston head 34 by means of one or more ports 108, 108. By this arrangement, the chamber 24 may be filled with hydraulic fluid through the passage 106 when the strut is in its extended position, as seen in the left half of Figure 1. Thereafter the cap 43 may be threaded on the rod 32 and the strut may be urged to compressed or closed position, as seen in the right half of Figure 1, thereby partially filling the reservoir chamber 26, whereupon the cap 43 may be removed and the upper extremity of the chamber 24 may be completely filled with hydraulic fluid through the passage 106 and the ports 108. By means of this novel arrangement, the strut may be filled with hydraulic fluid after the various parts have been assembled.

It will be noted that the resilient discs 44, 44 are disposed immediately beneath the radial passages 108, 108. The discs 44 are flexible away from the plunger head 34 and inasmuch as they are disposed immediately adjacent to the passageways ports 108 the fluid flowing through these passageways on closure of the strut will flow over the end disc or spring washer 44 and thus resist opening of valve plate 42. This feature also prevents fluttering of the spring washers and thus eliminates not only erratic action of the shock absorber but also reduces flexure of the spring washers 44 thereby greatly prolonging their life. It will be appreciated that this action is possible only because of the immediate proximity of the openings 108 to the washers 44 as may be readily seen in Figure 1.

It may also be noted that the gas spring within the cylinder 2 is at all times spaced from the hydraulic fluid within the hollow piston 6, thus preventing foaming of the hydraulic fluid as it is metered during actuation of the device.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In an hydraulic shock strut, a cylindrical follower, a hollow piston reciprocal therewithin, a plunger tube connected to the follower and arranged coaxial therewith and extending through the head of said piston and in fluid tight engagement therewith, said piston having a cylindrical chamber receiving said plunger tube therein, a plunger head connected to said tube and reciprocal within said piston chamber, said plunger head dividing said piston chamber into two axially spaced portions, one of said portions being disposed between the head of the piston and said plunger head, said plunger head having a plurality of ports therethrough, valve means formed and arranged to close said ports during extension of said strut and to open said ports during closure of the strut, said valve means comprising a plate and a plurality of spring washers disposed within said one portion of said piston chamber, said plate being adapted to seat against said plunger head to close the ports and said washers being arranged in a pile in shouldered engagement with the tube and reacting against said plate for urging said plate against said plunger head to the closed position thereof, passage means through said tube communicating with the other portion of said piston chamber, and radial passageways through said tube communicating with said passage means and with said one portion of said piston chamber, said piston chamber, passage means and passageways having all of the available spaces filled with fluid, said passageways being disposed immediately adjacent the end washer of the pile remote from the plate, said fluid during closure of said strut being accommodated flow from said other portion of said piston chamber to said one portion thereof through said passage means and passageways and co-incidentally through said ports by unseating said plate and flexing said washers, said fluid during closure of said strut issuing across the end washer and thus resisting flexure of said washers and opening of said valve means, and a gas spring acting between said follower and piston.

2. In an hydraulic shock absorber, a cylindrical member closed at opposite ends, a plunger comprising a tube extending through one end of said member, said member having a cylindrical chamber therein, a head carried by said tube for reciprocation within said chamber, said head dividing said chamber into two axially spaced portions, metering valve means within one portion of said chamber between said head and said one end of said member, by-pass valve means within the other portion of said chamber, said valve means being carried by said tube, said metering valve means comprising ports through the head, a passage through said tube communicating with the other portion of said chamber, a plate within said one portion sleeved on said tube, resilient discs reacting between said plate and said tube for closing said ports, radial passageways through said tube communicating with said one portion of said chamber and with said passage, said chamber, passage and passageways being filled with hydraulic fluid, said metering means being adapted to open said ports during closure of said strut by unseating of said plate against the flexure of said discs, the flexure of said discs and opening of said ports being resisted by fluid flowing through said passageways against said discs.

CARL E. TACK.
FRED E. BACHMAN.

REFERENCES CITED

The following references are of record in the file of this patent:

UNITED STATES PATENTS

| Number | Name | Date |
|---|---|---|
| 1,291,016 | Kellogg | Jan. 14, 1919 |
| 1,918,697 | Gruss | July 18, 1933 |
| 2,057,893 | Gross | Oct. 20, 1936 |
| 2,078,364 | Becker et al. | Apr. 27, 1937 |
| 2,089,656 | Magrum | Aug. 10, 1937 |
| 2,138,513 | Rossman et al. | Nov. 29, 1938 |

FOREIGN PATENTS

| Number | Country | Date |
|---|---|---|
| 452,895 | Great Britain | Sept. 1, 1936 |
| 496,059 | Great Britain | Nov. 24, 1938 |
| 359,228 | Italy | May 16, 1938 |